(12) United States Patent
Moore et al.

(10) Patent No.: US 8,661,781 B2
(45) Date of Patent: Mar. 4, 2014

(54) COUNTER ROTATING FAN DESIGN AND VARIABLE BLADE ROW SPACING OPTIMIZATION FOR LOW ENVIRONMENTAL IMPACT

(75) Inventors: Matthew D. Moore, Everett, WA (US);
Kelly L. Boren, Marysville, WA (US);
Robin B. Langtry, Burien, WA (US)

(73) Assignee: The Boeing Company, Chicago, IL (US)

( * ) Notice: Subject to any disclaimer, the term of this patent is extended or adjusted under 35 U.S.C. 154(b) by 1029 days.

(21) Appl. No.: 12/371,413

(22) Filed: Feb. 13, 2009

(65) Prior Publication Data

US 2010/0206982 A1 Aug. 19, 2010

(51) Int. Cl.
*F02C 7/36* (2006.01)
*B64D 35/06* (2006.01)

(52) U.S. Cl.
USPC ............... 60/204; 60/263; 60/268; 60/226.1; 244/17.23; 416/124; 416/128

(58) Field of Classification Search
USPC ............ 60/226.1, 263, 268, 204; 415/34, 48, 415/66, 68, 69, 131, 132; 416/124, 126, 416/128, 129, 149, 150, 161; 244/17.23, 244/17.13, 17.11
See application file for complete search history.

(56) References Cited

U.S. PATENT DOCUMENTS

| 1,585,218 | A | * | 5/1926 | Watanabe | 416/1 |
| 1,788,307 | A | * | 1/1931 | Lack | 416/121 |
| 2,192,469 | A | * | 3/1940 | Green | 416/121 |
| 2,416,689 | A | * | 3/1947 | Grady | 416/129 |
| 3,409,249 | A | * | 11/1968 | Bergquist et al. | 244/17.13 |
| 3,592,559 | A | * | 7/1971 | Ward | 416/121 |
| 4,381,901 | A | * | 5/1983 | Labudde | 416/121 |
| 4,765,135 | A | * | 8/1988 | Lardellier | 60/226.2 |
| 4,958,289 | A | * | 9/1990 | Sum et al. | 701/99 |
| 4,983,151 | A | * | 1/1991 | Pires | 475/170 |
| 5,054,998 | A | * | 10/1991 | Davenport | 416/1 |
| 2005/0151001 | A1 | * | 7/2005 | Loper | 244/6 |
| 2008/0090695 | A1 | * | 4/2008 | Jones | 476/67 |

FOREIGN PATENT DOCUMENTS

FR 886149 A 10/1943
WO 2008096124 A2 8/2008

OTHER PUBLICATIONS

Dittmar, J. H. "The Effect of Front-to-Rear Propeller Spacing on the Interaction Noise of a Model Counterrotation Propeller at Cruise Conditions", NASA Technical Memorandum 100121, Lewis Research Center, Cleveland, OH, Aug. 1987, p. 3.*
Dittmar, James H. "Some Design Philosophy for Reducing the Community Noise of Advanced Counter-Rotation Propellers", NASA Technical Memorandum, Scientfic and Technical Information, Hanover, MD, US, vol. TM-87099, Aug. 1, 1995, XP009118109 ISSN 0499-9320.

(Continued)

*Primary Examiner* — William H Rodriguez
*Assistant Examiner* — Lorne Meade
(74) *Attorney, Agent, or Firm* — Felix L. Fischer

(57) ABSTRACT

An air vehicle propulsion system incorporates an engine core with a power shaft to drive an outer blade row. The power shaft extends through and is supported by a counter rotation transmission unit which drives an inner blade row in counter rotational motion to the outer blade row. The counter rotation transmission unit exchanges power from the engine core with the shaft. An actuator engages the shaft for translation from a first retracted position to a second extended position.

18 Claims, 17 Drawing Sheets

(56) References Cited

OTHER PUBLICATIONS

Magliozzi, B., "Noise Characteristics of a Model Counterrotating Prop-Fan", AIAA 11th Aeroacoustics Conference, Sunnyvale, California, USA, vol. 11th, No. AIAA-87/2656 Oct. 19, 1987 pp. 1-13 XP002486865.

Sweetman, Bill, "The Short, Happy Life of the Prop-fan" History of Flight Air & Space Magazine, Sep. 1, 2005.

* cited by examiner

Preferred operational spacing schedule

Preferred Upstream/Downstream
SHP ratio schedule

COUNTER ROTATING FAN DESIGN AND VARIABLE BLADE ROW SPACING OPTIMIZATION FOR LOW ENVIRONMENTAL IMPACT

BACKGROUND INFORMATION

1. Field

Embodiments of the disclosure relate generally to the field of propulsion systems for aircraft and more particularly to embodiments for a counter rotating fan with a variable blade row spacing.

2. Background

The escalating cost of aviation jet fuel, enactment of and anticipated growth in carbon-related taxation regulations has created an enthusiastic industry-wide resurgence into Propfan or Open-Fan technology, as demand for travel continues to climb with sustained pressure to minimize fare increases. Concurrently; due to increased travel the legal noise limits imposed by the United States Federal Aviation Administration (FAA) and the International (ICAO) agencies for engine and aircraft certification have become more stringent. In many countries, local aviation authorities have imposed a combination of fees, curfews, and quotas aimed to offset the growth of noise exposure and costs associated with abatement, including sound-proofing homes. For enforcement, numerous airports have installed microphones in noise sensitive communities that currently force operators to sacrifice payload and or range to avoid violation of these local noise policies. Furthermore, it is anticipated that local air-quality or other carbon related environmental costs could be imposed.

Additionally, evolving demand for expanded point-to-point service beyond traditional narrow-body markets and operational flexibility drives designers to further emphasize fuel efficiency relative to other tradeoffs.

Improved fuel consumption may be obtained by reducing cruise speed however this may increase flight time and be undesirable to passengers, the net fuel benefit may be fairly small, challenges with air traffic integration may be created, the number of revenue flights in a given day might be reduced, and this approach may actually result in an increase of other airline operating costs. In order to achieve the cruise speeds of today's jet powered aircraft (~Mach 0.8) counter rotation open fan (CROF) systems are needed, since single rotation/stage turboprops are practically limited to cruise speeds of roughly Mach 0.7 due to insufficient specific thrust.

Counter Rotating Open Fans have complex noise sources that single rotation turboprops do not have; specifically propeller wake interaction and tip vortex interaction noise. Both of these noise sources may result in external environmental noise which affects airport communities, cabin noise which affects passenger comfort, and airplane structural sonic fatigue.

A highly complex trade between these noise sources and net propulsive efficiency exists for various design approaches. Wake interaction noise, which is undesirable, and propulsive efficiency, which is desired, tend to decrease with greater spacing between the fans. However, vortex interaction noise, which is undesirable, may actually increase with spacing depending on free stream Mach number, local flow effects, angle of attack and downstream propeller row diameter due to the stream tube contraction after the first row of blades.

Vortex interaction avoidance is typically of highest priority to designers, however the only means in present designs to accomplish this is to "crop" or reduce the diameter of the aft or down-stream rotor. This however may carry a performance penalty as the aerodynamic efficiency may be compromised in the same fashion as a fixed wing due to loss of span/aspect ratio. A key challenge for the designer is that vortex interaction is affected by several factors. The strength of the vortex is influenced mostly by blade tip loading and the path of the tip vortex is greatly affected by free-stream momentum and angle of attack. With lower cruise speeds the tip vortex collapses toward the root of the aft/downstream rotor interacting with it and causing vortex interaction noise. Because of this designers of CROF engines in the prior art typically have chosen an aggressive degree of spacing and cropping (10% or greater) so that vortex interaction is avoided under limiting operational conditions such as, for example, the highest thrust rating and climb trajectory with maximum vortex plume contraction. This may result in the airplane reduced performance for all operational conditions.

SUMMARY

Exemplary embodiments provide an air vehicle propulsion system which incorporates an engine core with a power shaft to drive an outer blade row. The power shaft is interconnected to exchange power with a counter rotational transmission unit which drives an inner blade row in counter rotational motion to the outer blade row. An actuator engages the shaft for translation from a first retracted position to a second extended position.

In a first exemplary embodiment, counter rotation transmission unit carries the inner blade row with the power shaft extending through and supported by the unit. One aspect of the embodiment includes a pitch control unit for the inner blade row and a pitch control unit for the outer blade row.

For one implementation of the exemplary embodiment, the outer blade row is upstream of the inner blade row in a tractor configuration and power supplied by the power shaft to the outer blade row is less than power supplied to the inner blade row by the counter rotation transmission unit with the outer blade row in the extended position. In one exemplary configuration, the ratio of power supplied to the outer blade row and inner blade row is substantially less than 1.0 during noise sensitive portions of the mission. This implementation further provides that the inner blade row has a diameter cropped by less than 5% of a diameter of the outer blade row.

To accommodate various operational requirements, translation of the concentric shaft in the exemplary embodiments is incrementally variable from the first position to the second position. The counter rotation transmission unit employs a continuously variable transmission for variable differential rotation speed between the inner and outer blade rows which is adjustable for the translation of the outer blade row. The counter rotation transmission unit includes a pitch control unit for the inner blade row and the outer blade row includes a pitch control unit. A controller is included for adjusting the translation of the outer blade row, controlling the pitch control units for the inner and outer blade rows and controlling the variable transmission for a predetermined schedule of operation.

In one alternative embodiment the inner and outer blade rows comprise a ducted fan. In an additional alternative embodiment the outer blade row is downstream of the inner blade row in a pusher configuration.

Noise reduction in counter rotating fan propulsion is accomplished by providing an engine core, driving an outer blade row from the engine core and driving an inner blade row from the engine core. The outer blade row is translated away from the inner blade row for operation at low speed and power distribution to the inner blade row and outer blade row is controlled for lower power generation by the upstream blade row in the translated position.

The features, functions, and advantages that have been discussed can be achieved independently in various embodiments of the present invention or may be combined in yet other embodiments further details of which can be seen with reference to the following description and drawings.

DETAILED DESCRIPTION

Figure 4A:
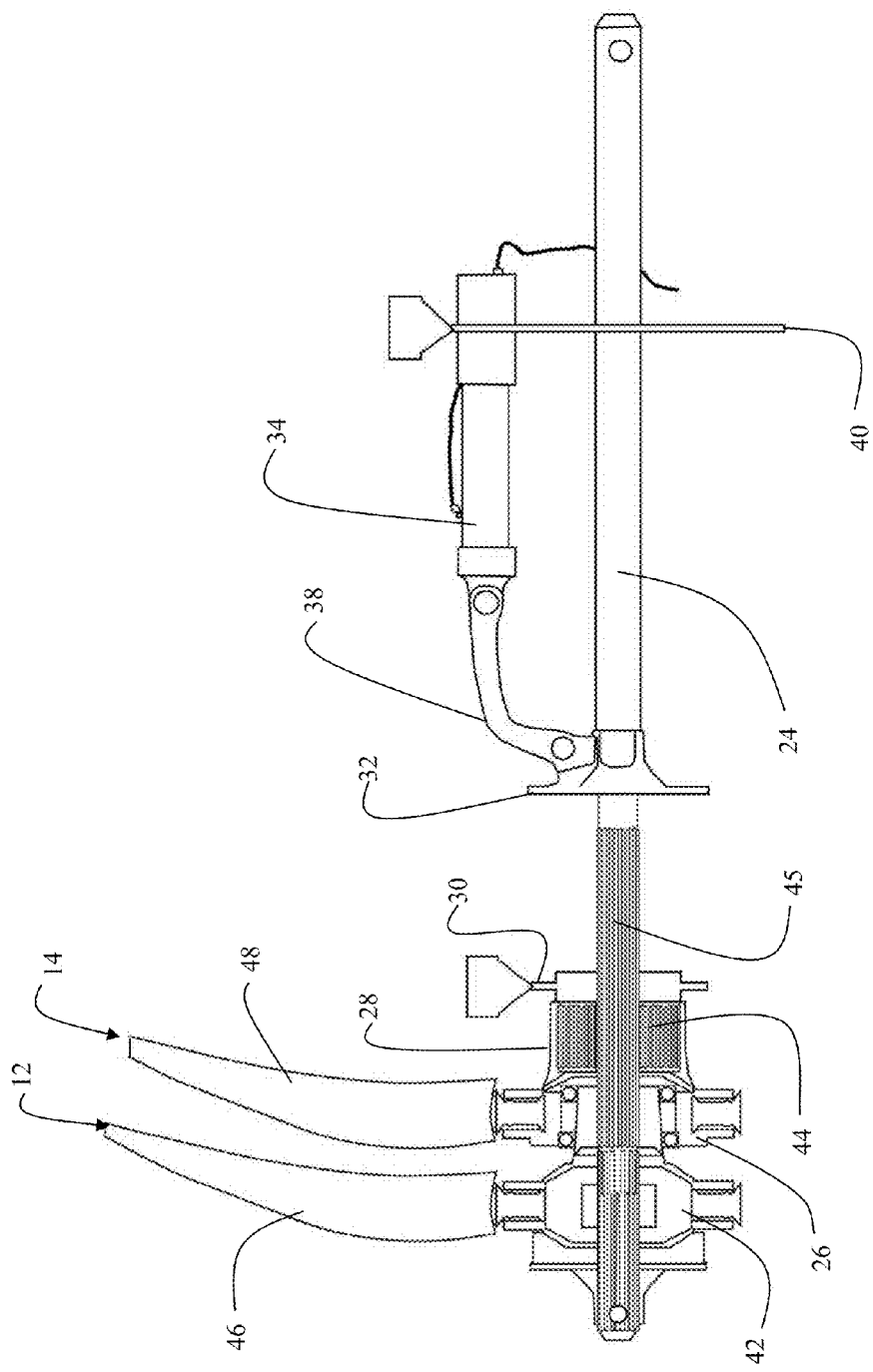
FIG. 4A is a side section view of the selected components as shown in FIGS. 2A and 2B with the outer blade row retracted.
Figure 4B:
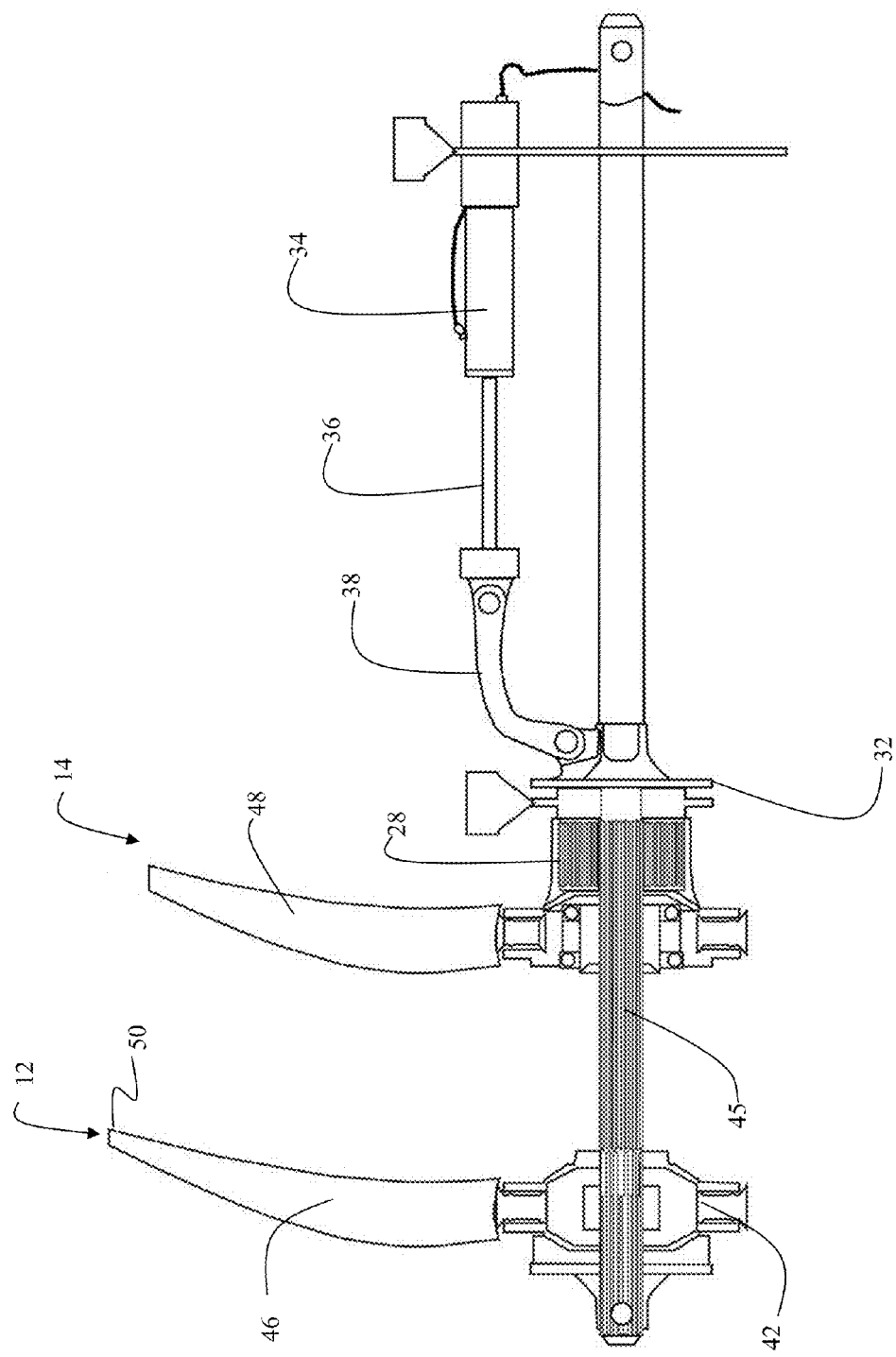
FIG. 4B is a side section view of the selected components as shown in FIGS. 2A and 2B with the outer blade row extended.

The embodiments disclosed herein provide counter rotating open fans (CROF) having adjustable positioning/spacing of adjacent airfoil blade rows during operation for real-time optimization of efficiency and noise in selected portions of the flight profile. A first embodiment shown in FIG. 1 employs a tractor configuration having an engine core 10 driving an outer upstream fan or blade row 12 and an inner downstream fan or blade row 14. For this embodiment, the upstream blade row has a larger diameter and is the outer row relative to the engine core and the downstream blade row is the inner row relative to the engine core and has a smaller diameter. For the descriptions herein, fan, blade row and rotor shall have substantially identical meaning. The engine core incorporates inlets 16 providing combustion air to a multi-stage compressor section 18 with a combustor 20 and a turbine section 22. Power to the blade rows 12 and 14 is provided through a shaft 24 driven by the turbine section 22. The downstream blade row incorporates a blade pitch control unit 26 integrated in a forward fan concentric counter-rotation transmission unit 28 carried by a structural bearing and support ring 30 (as seen and described in greater detail with respect to FIGS. 4E and 4F). Shaft 24 is rotationally supported by concentric counter-rotation transmission unit 28 and exchanges power through the transmission unit to the inner blade row as will be described with respect to FIGS. 4A and 4B.

Figure 1:
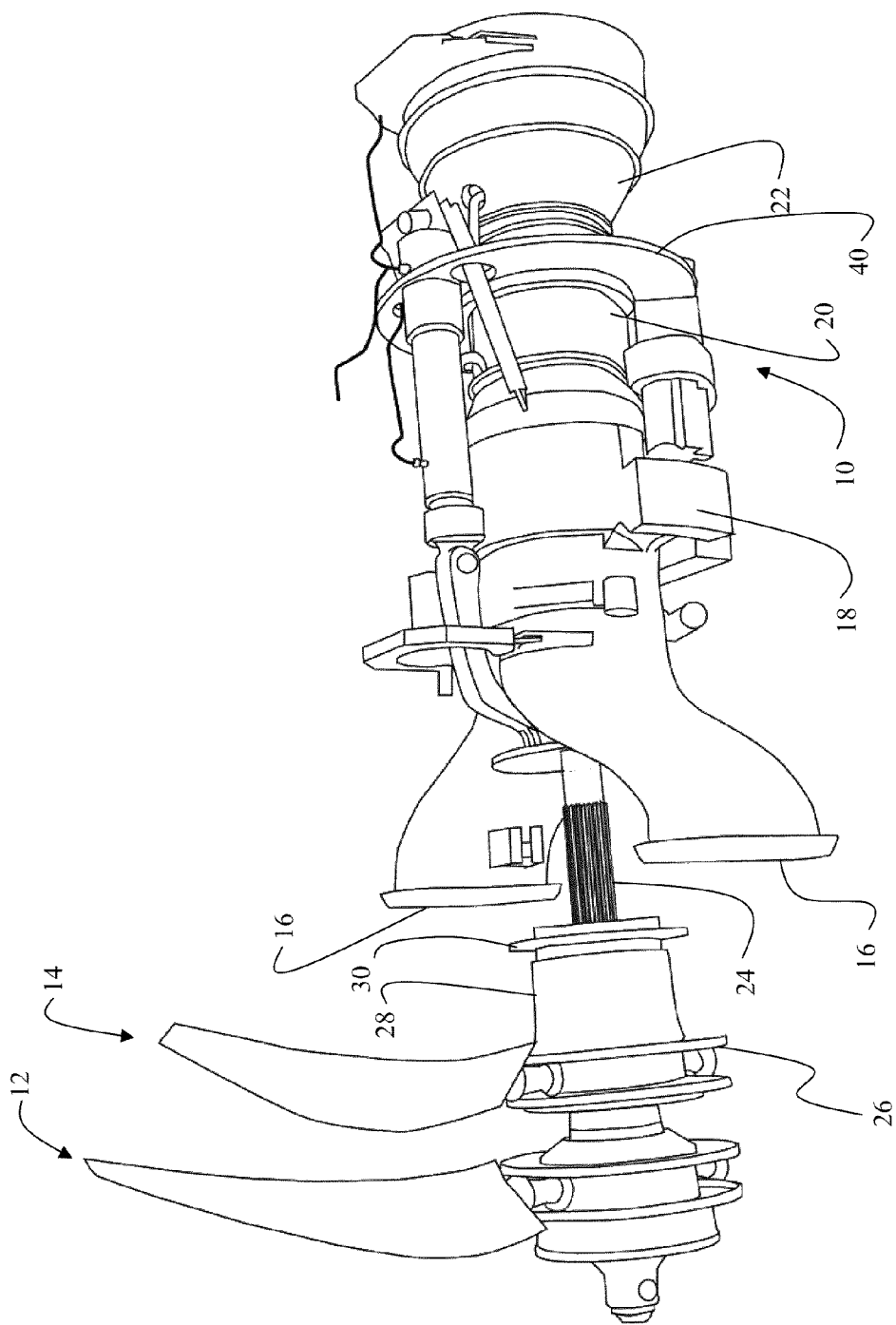
FIG. 1 is a side partial section view of a first tractor embodiment with the upstream blade row in a retracted position.
Figure 2A:
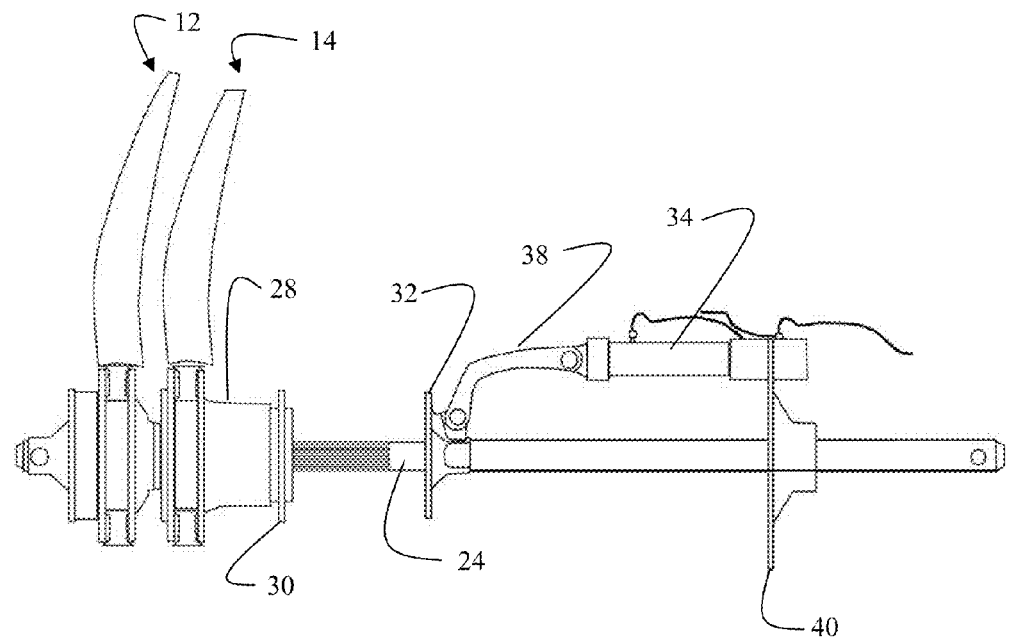
FIG. 2A is a side view of selected components as shown in FIG. 1 with the outer blade row in the retracted position.
Figure 2B:
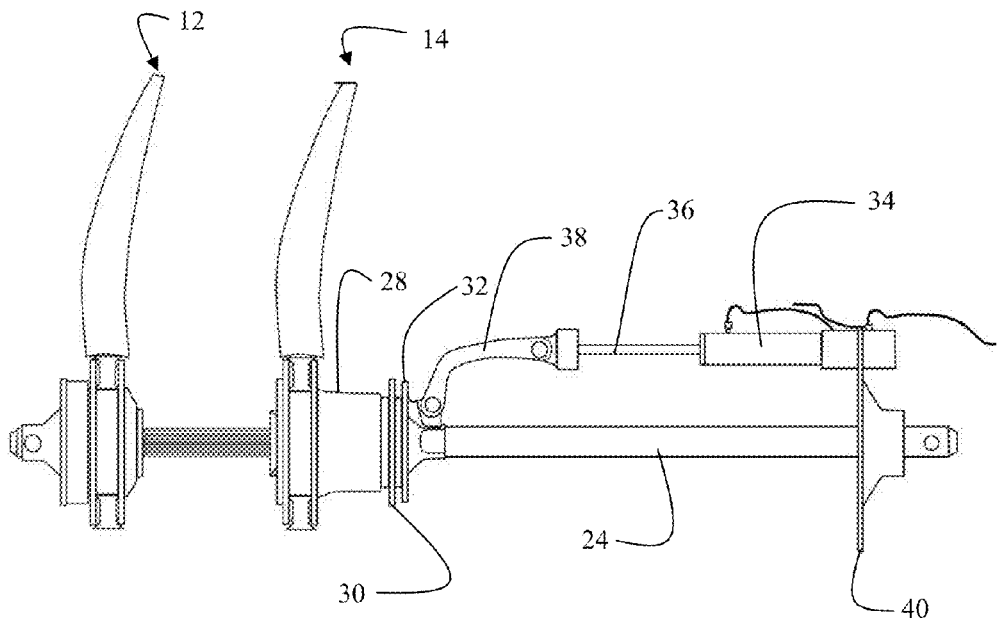
FIG. 2B is a side view of the selected components as shown in FIG. 2A with the outer blade row in the extended position.
Figure 3:
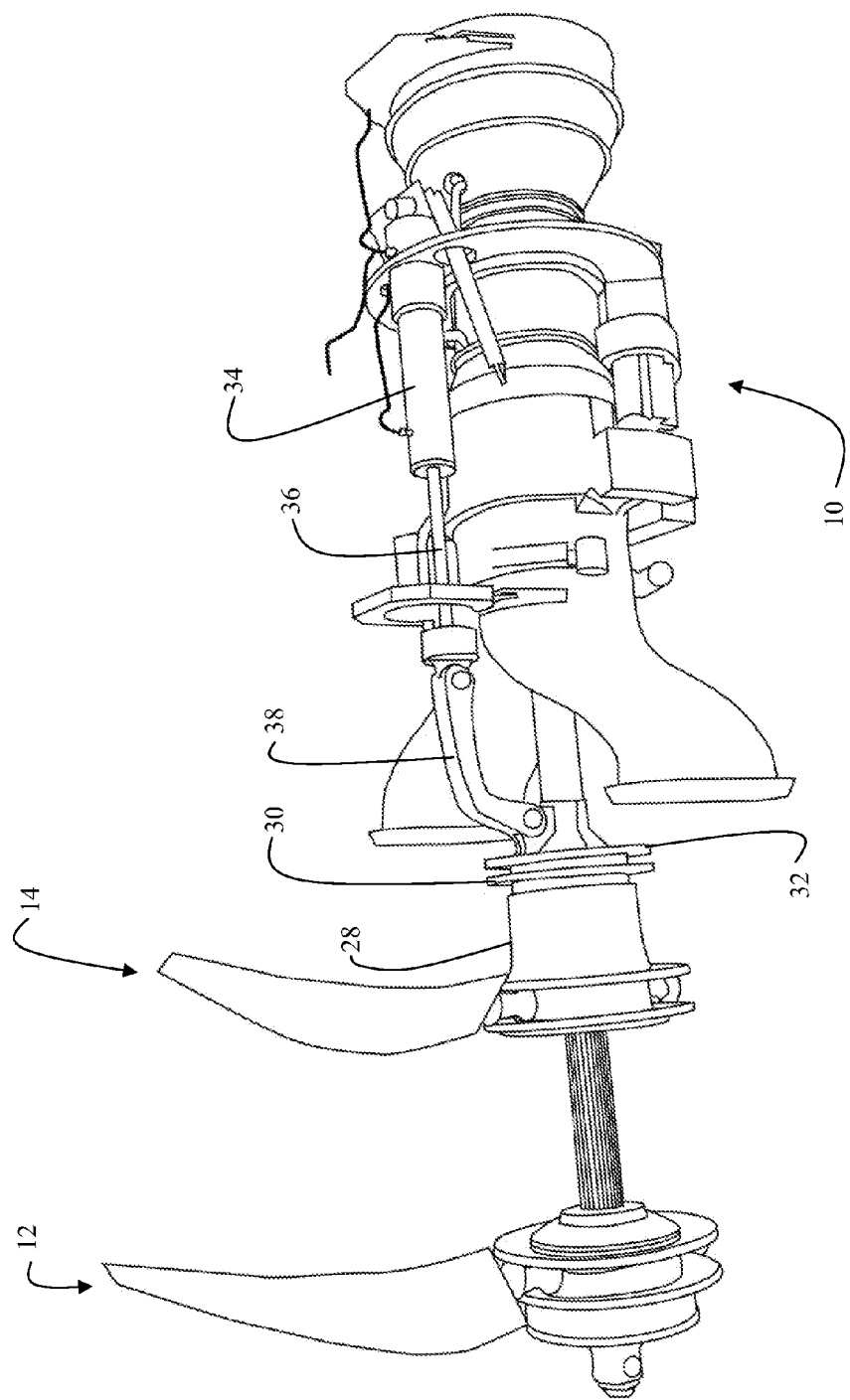
FIG. 3 is a partial side sectional view of the embodiment of FIG. 1 with the upstream blade row in an extended position.

As best seen in FIGS. 2A and 2B, shaft 24 is engaged by a pressure plate 32 for positioning of the outer upstream blade row 12 relative to the inner downstream blade row 14. An actuator 34, which in various embodiments may be hydraulic, pneumatic, or electromechanical, is nested on the exterior periphery of the engine core 10 and provides linear actuation of the pressure plate 32 through a linear actuating rod 36 and angle arm 38. For the embodiment shown the actuator 34 is supported from a rear mounting plate 40 integral with the engine core through which power shaft 24 rotates and which provides an additional support point for the engine as discussed subsequently with respect to FIGS. 4E and 4F. FIG. 1 and FIG. 2A show the actuator in a retracted first position placing the outer or upstream blade row 12 in close proximity to the inner or downstream blade row 14 for maximum optimized performance as will be described subsequently. FIGS. 2B and 3 show the actuator in the extended position displacing the drive shaft 24 to a second position of maximum extension for separation of the upstream or outer and downstream or inner blade rows 12, 14.

FIGS. 4A-4D show in detail the configuration of the counter rotation transmission unit 28, the associated inner blade row pitch control unit 26, as well as the pitch control unit 42 of the outer blade row 12. Primary shaft 24 rotates the forward pitch control unit 42 and counter rotational gears 44 in the concentric counter rotation transmission unit 28 extract power from the primary shaft 24 by engaging splines 45 on the shaft 24 to power the aft pitch control unit 26 for the downstream blade row. The gearing may incorporate a continuously variable transmission capability for varying the gear ratio for power distribution to the forward and aft pitch control units for the outer and inner blade rows respectively. The combination of rotational speed for each blade row and the associated pitch control adjustment provides the scheduling of actual thrust provided by each blade row.

Figure 4C:
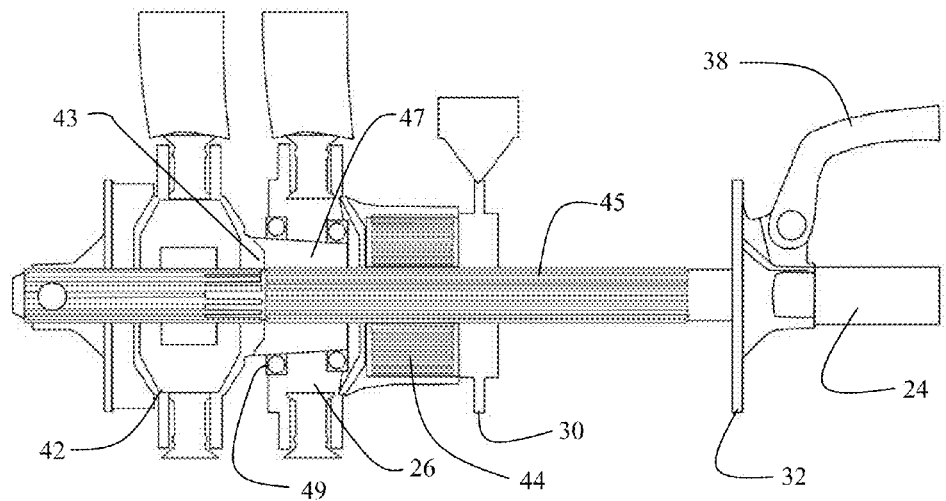
FIG. 4C is a detailed section view of the outer blade row and inner blade row with their associated pitch control units and the concentric counter rotation transmission and hub unit for the shaft with the outer blade row in the retracted position.
Figure 4D:
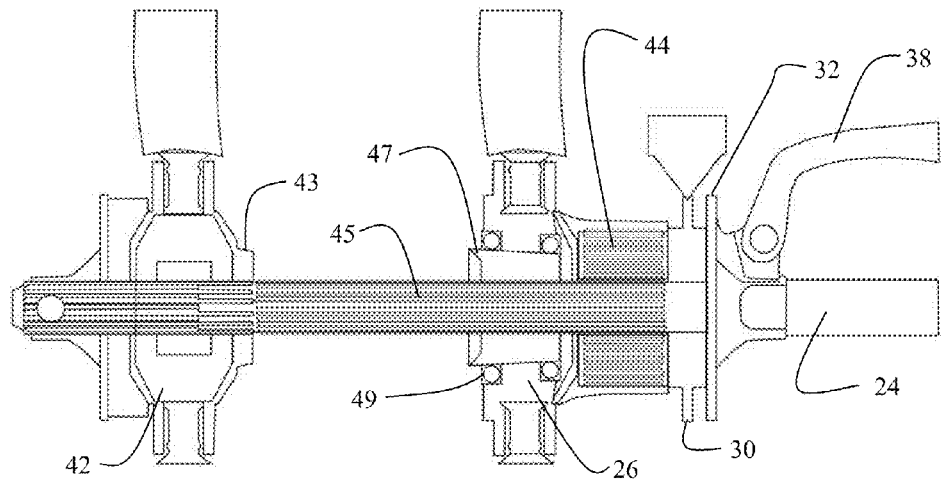
FIG. 4D is a detailed section view of the outer blade row and inner blade row with their associated pitch control units and the concentric counter rotation and hub unit for the shaft with the outer blade row in the extended position.

As shown in detail in FIGS. 4C and 4D, a capture cup 47 engages splines 45 and rotates with the shaft 24 concentrically supported by bearing sets 49 within the pitch control unit 26 of the inner blade row. The pitch control unit 42 of the outer blade row incorporates an aft flange 43 which is received by the capture cup in the retracted position. Rotation of the capture cup coincident with the shaft provides additional bearing support for the shaft and prevents any "spin up" requirements for the bearings upon retraction of the outer blade row by maintaining constant rotational speed between the capture cup and the aft flange of the outer blade row for engagement.

Figure 4E:
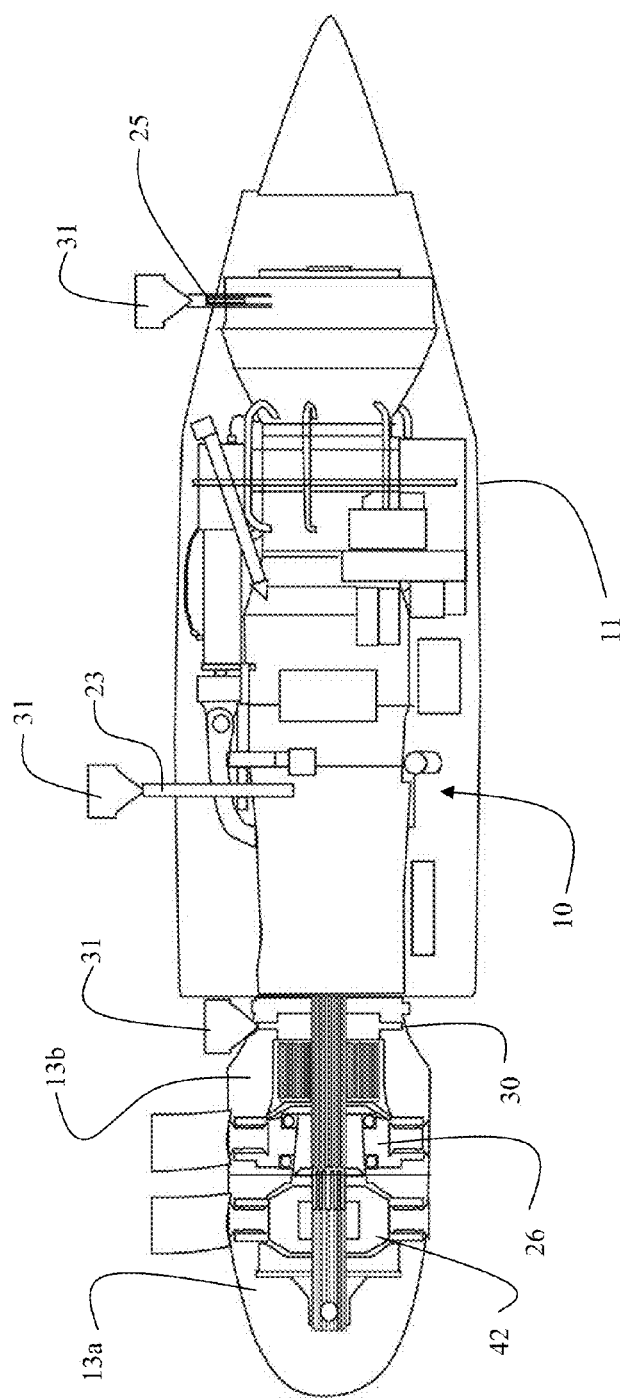
FIG. 4E is a partial section view of a complete engine arrangement with the blade rows, hubs and spinner elements shown in section with the outer blade row retracted.
Figure 4F:
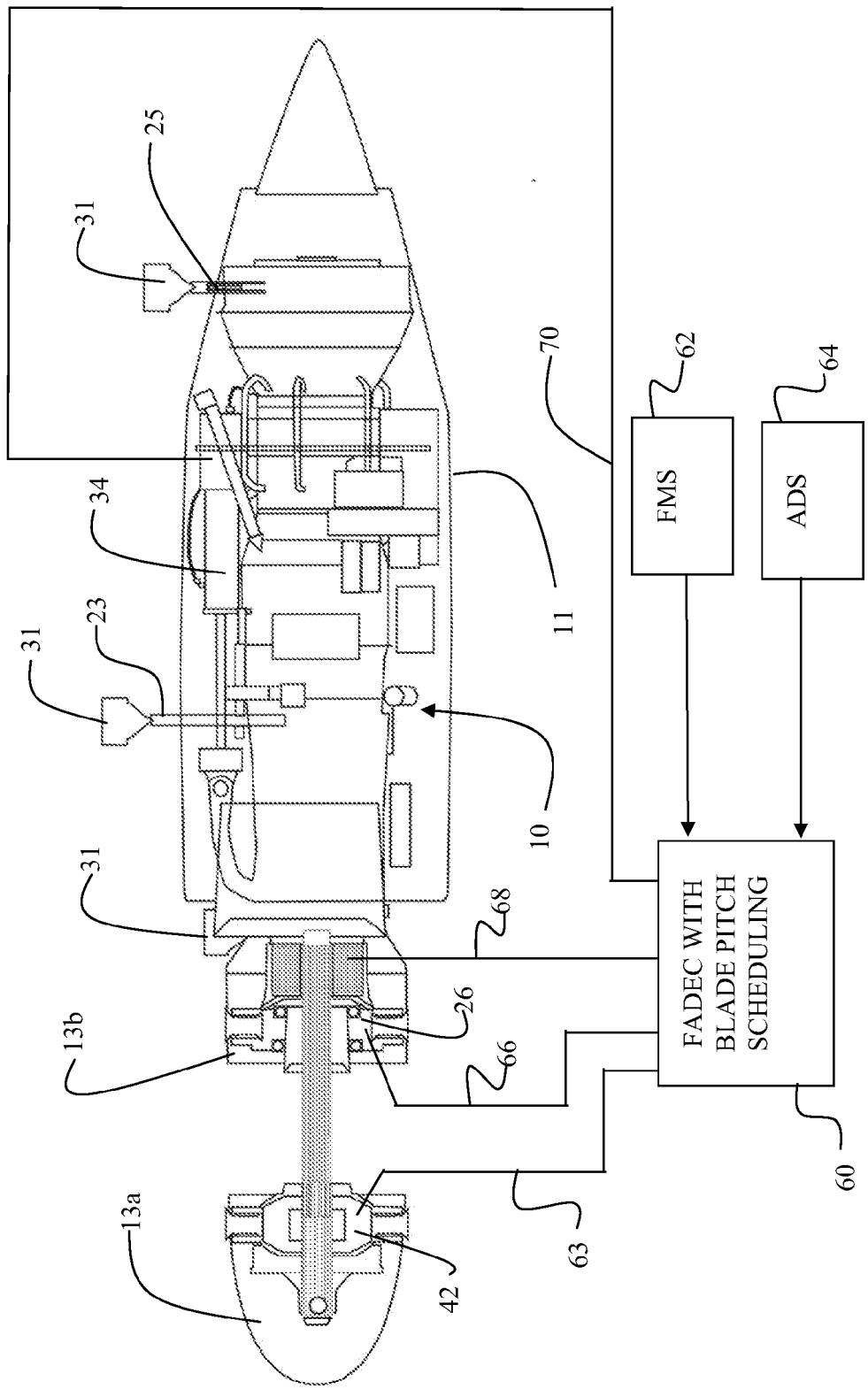
FIG. 4F is a partial section view of a complete engine arrangement with the blade rows, hubs and spinner elements shown in section with the outer blade row extended and showing in block diagram form a control system.

FIGS. 4E and 4F demonstrate an exemplary configuration of the described embodiments for integration with an aircraft. The engine core 10 incorporates support points 23 and 25 which are supplemented by the concentric support ring 30 and, in alternative embodiments the rear mounting plate 40, and attach to structural connections in a pylon or alternative engine support structure having structural attachments generically designated as elements 31. Engine core 10 is contained in a cowling 11 and an aerodynamic split spinner 13a, 13b houses the pitch control units 42 and 26 as well as the concentric counter-rotation transmission unit 28.

For the embodiment shown, upstream blades 46 in the outer blade row 12 are designed with a slightly lower activity factor than downstream blades 48 constituting the inner blade row 14. The activity factor is a measure of the ability of a propeller (or in the present case an open fan) to absorb power. It is defined as the ratio of rotor blade area to the rotor disc area. In an exemplary embodiment the minimum upstream blade row activity factor is about 150 and a preferred ratio of activity factor between the upstream blade row and downstream blade row is less than 0.9. Tips 50 of the upstream blades may incorporate shaping or other treatment for reduction of the tip vortex intensity.

Figure 6:
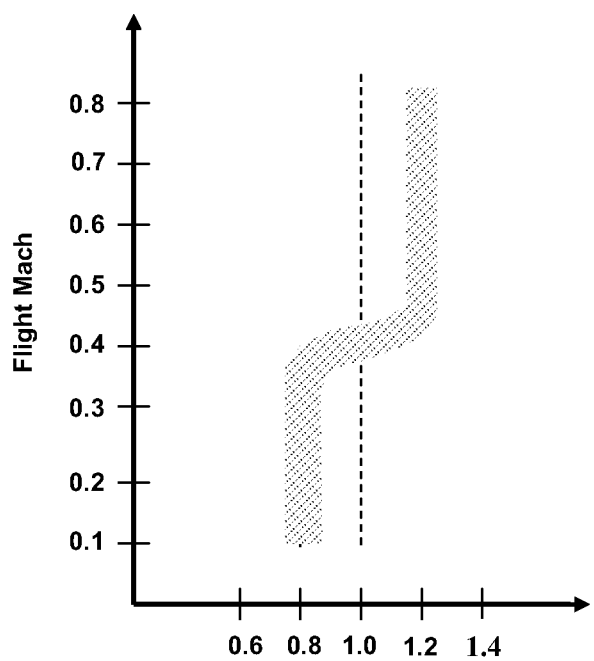
FIG. 6 is a graphical representation of preferred shaft horsepower ratio scheduling between the upstream and downstream blade rows.

Shaft horsepower distribution between the upstream blade row and downstream blade row is adjustable via blade spacing, blade pitch or a combination of the two and is governed transparently to the pilot through use of the flight management system (FMS) and full authority digital engine control (FADEC). For very fine incremental adjustments to this ratio, pitch actuation of alternating blades may be accomplished if the blade row has an even number of blades. As shown in FIG. 6 the desired ratio of upstream/downstream shaft horsepower is substantially less than 1 (nominally 0.8) for flight Mach numbers between 0.1 and 0.4. This allows the downstream blade row to carry the majority of the total shaft horsepower during takeoff and other noise sensitive operational phases, reducing the intensity of upstream distortion that the rear blade encounters provided in this embodiment by a rear rotor with less overall cropping than current art. At Mach numbers above 0.4 to an approximate performance maximum of Mach 0.8 the desired ratio of upstream/downstream shaft horsepower is between 1.2 and 1.3 (nominally 1.25) allowing the upstream blade row to carry the greater portion of the shaft horsepower at higher cruise speeds. The combined reduction in wake interaction noise provided by the preferred ratio of coefficient of lift to coefficient of drag (CL/CD) and the reduction in upstream blade row design shaft horsepower enables closer spacing with the upstream blade row retracted in a second or high performance position for a constant wake interaction noise and greater propulsive efficiency. Additionally, reducing the shaft horsepower and relative tip mach of the upstream blade row reduces the tip vortex strength and noise.

Figure 5:
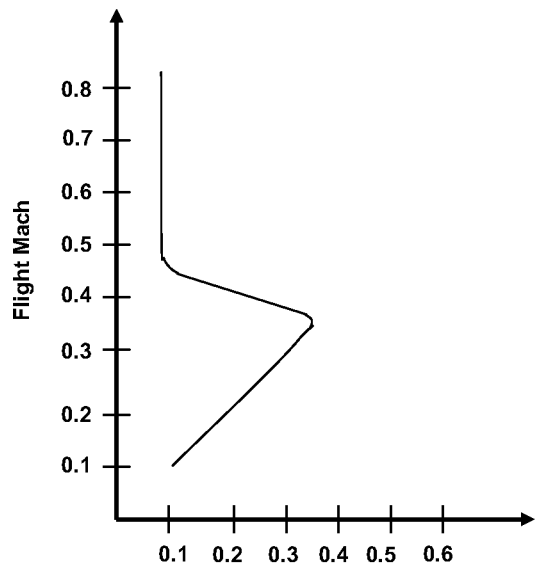
FIG. 5 is a graphical representation of the control operational spacing schedule for the blade rows.

The embodiment described provides for maximum performance in the retracted or minimum spacing position. As shown in FIG. 5, which provides a schedule of preferred operational spacing between the upstream blade row and downstream blade row, the blades initially reside in the minimum spacing position of approximately 0.1 to 0.2 times the upstream blade disc diameter with actuation for extension of the upstream blade row to approximately 0.4 to 0.5 times the upstream blade disc diameter at approximately Mach 0.4. This provides for optimum spacing of the blade rows to minimize noise during low-speed, take off, and in initial climb operational phases. For the embodiments shown, incremental translation of the blade rows between the extended and retracted positions for desired spacing and shaft horsepower distribution are controlled by performance tables in a Full Authority Digital Engine Control (FADEC) as a function of angle of attack (AOA) and airspeed or Mach number. Stream tube contraction is a consistent and measurable function of AOA and Mach number which may be calculated from data provided by the air data system (ADS) of the aircraft and incorporated with input from the flight management system (FMS) to the FADEC for aircraft control. Spacing logic then nominally keeps the downstream rotor from interacting with tip vorticies created by the upstream rotor which follows the stream tube. A capability built into an integrated Pitch Control Unit (PCU) controller and FADEC systems logic to partially reduce lift generated by the blades of the translating row; thereby reducing the power required by the actuator for translating the row. The configuration as described with respect to FIGS. 1 through 4F provides for extension of the actuator to place the upstream blade row in the extended position.

Compensation for an anomalous condition in the system is provided to fix the blade rows or retract the upstream blade row. Specifically; when the airplane passes the noise sensitive portion of the flight mission a locking mechanism is employed to keep the front propeller disc in position so that if a loss of hydraulic or pneumatic pressure does occur a sudden extension of the front rotor disc which could affect the airplane stability or effect engine operation is avoided. Mechanical locking systems are preferred for situations where the rotor disc is fully retracted however a fluidic system composed of a check valve is recommended for situations where an actuator system failure occurs while the front disk is partially extended. Each exemplary system prevents sudden extension of the front disc rotor.

Figure 7:
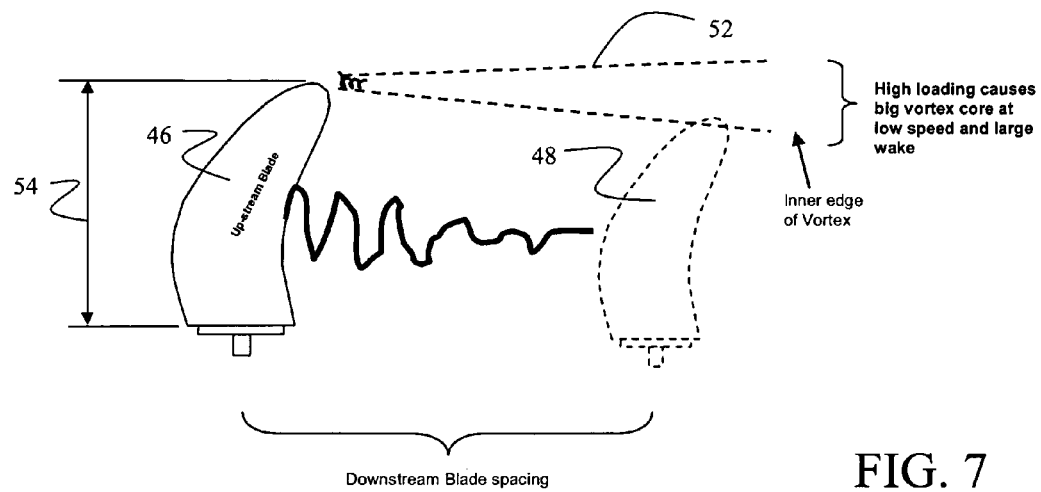
FIG. 7 is a schematic representation of the vortex created by the upstream blade row and interaction with a cropped downstream blade row in prior art designs.
Figure 8:
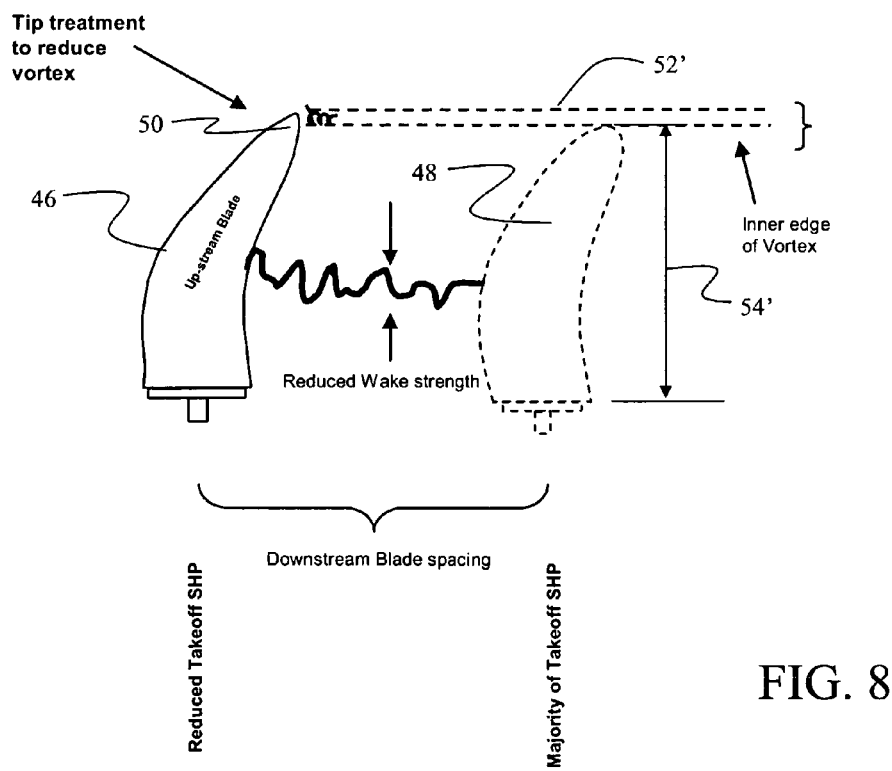
FIG. 8 is a schematic representation of the reduced vortex created by the upstream blade row in the disclosed embodiments and interaction with a downstream blade row having reduced cropping.

In conventional CROF systems the vortex core 52 produced by the upstream blade row requires cropping of the downstream blade row as shown in FIG. 7 to reduce vortex noise interaction when the blade rows are separated for minimizing wake interaction noise. Because tip vortex travel is governed by forward airspeed and inflow angle of attack, the cropping is typically set at a level whereby vortex interaction is prevented over the limiting conditions during noise sensitive portions of flight. Cropping to reduce the overall span 54 of the downstream blades of approximately 10%-20% to reduce noise by 3EPNdB would normally be required and is common in the art. More stringent noise requirements may increase the required cropping for noise compliance, however a steep performance penalty accompanies any cropping. With the embodiments disclosed, reduction in the tip vortex 52' shown in FIG. 8 allows the overall span 54' of downstream blades to be cropped by 5% or less relative to the upstream blade row diameter.

Figure 9:
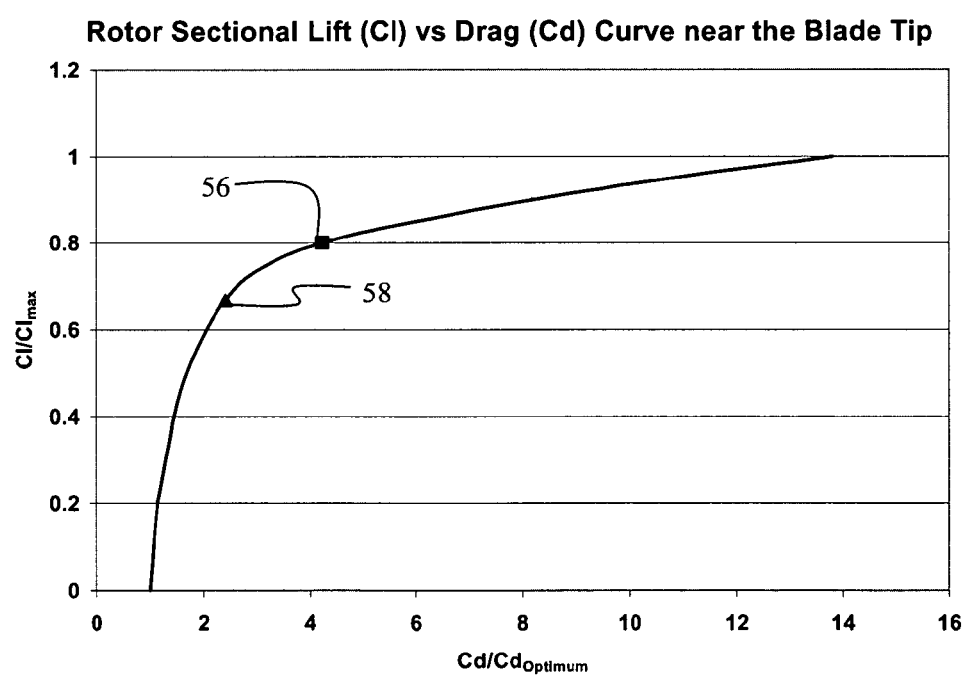
FIG. 9 is a graph of normalized lift coefficient and drag coefficient for the upstream and downstream blade rows.

For many counter rotating open fan designs, data indicates that most of the open rotor wake interaction noise is generated near the blade tip of the downstream rotor. The strength of the wake interaction noise is a strong function of the velocity deficit in the wake of the upstream rotor. In turn the velocity deficit in the upstream rotor wake is primarily a function of the drag coefficient and the distance from the trailing edge of the upstream rotor. As the lift coefficient of the blade (i.e. the thrust) increases there is a point where the drag will increase substantially and result in a significant wake velocity deficit and increased noise if the second rotor encounters this wake. This is illustrated in FIG. 9. In the present embodiment, takeoff noise may be minimized by scheduling the thrust breakdown between the upstream rotor and downstream rotor to minimize the drag (and hence wake velocity deficit) of the upstream rotor while still being able to achieve the required takeoff thrust. This is illustrated in FIG. 9 where the upstream rotor has a normalized blade tip sectional coefficient of lift ($C_L$) identified with numeral 58 of about 0.65 operating in the drag bucket while the downstream rotor is operating at a higher $C_L$ identified with numeral 56 of about 0.8 (with correspondingly higher drag) in order to achieve the required takeoff thrust. FIG. 9 is illustrative of a thrust ratio between the upstream rotor and the downstream rotor of approximately 0.8 as previously described with respect to the take-off and low speed operation shown in FIG. 6. Having a higher $C_L$ on the downstream rotor than the upstream rotor during takeoff conditions permits closer blade spacing for the equivalent wake interaction noise with acceptable reduction in efficiency at takeoff.

Returning to FIG. 4F, control of blade row spacing, pitch and applied shaft horsepower is accomplished through the combined actions of the airplane flight management system (FMS) and the full authority digital engine control (FADEC) unit which control blade scheduling system 60. Airplane condition and configuration data; Pilot control inputs 62 and air data 64 are concurrently processed by the FMS and the FADEC to provide control of the engine core through inputs 63 to the engine control unit. Pitch settings for the forward pitch control unit 42 and the aft pitch control unit 26 are provided through control inputs 63 and 66 respectively from the FADEC. Control inputs 68 to the counter rotational gears 44 in the concentric counter rotation transmission unit 28 distribute shaft horsepower generated by the engine core to the upstream blade row and downstream blade row through pitch control units 26 and 42. As previously noted, the counter rotational gearing may be accomplished with a continuously variable transmission. Control of the displacement actuator 34 is provided by the FADEC through control input 70. Control of the horsepower distribution, blade row spacing and pitch by the FADEC allows optimum downstream blade row spacing for maximum swirl recovery and efficiency varying with upstream rotor shaft horsepower and forward airspeed. While the spacing scheduling profiles are shown in an exemplary manner in FIG. 5, as previously described, the variable and real-time spacing schedule provided by the FADEC enables the most efficient propeller configuration throughout the entire flight regime within noise constraint envelopes and the spacing can be continually optimized in-flight for all certified airspeeds and flight trajectory angles. This includes takeoff or landing emergency conditions wherein the propellers are retracted to the maximum performance position. Exemplary embodiment may provide a fan efficiency benefit of at least 1.0% relative to the combined spacing and cropping necessary to meet noise requirements for a 'fixed' CROF system. Such fan efficiency improvement corresponds to a 1% specific fuel consumption improvement.

Figure 10A:
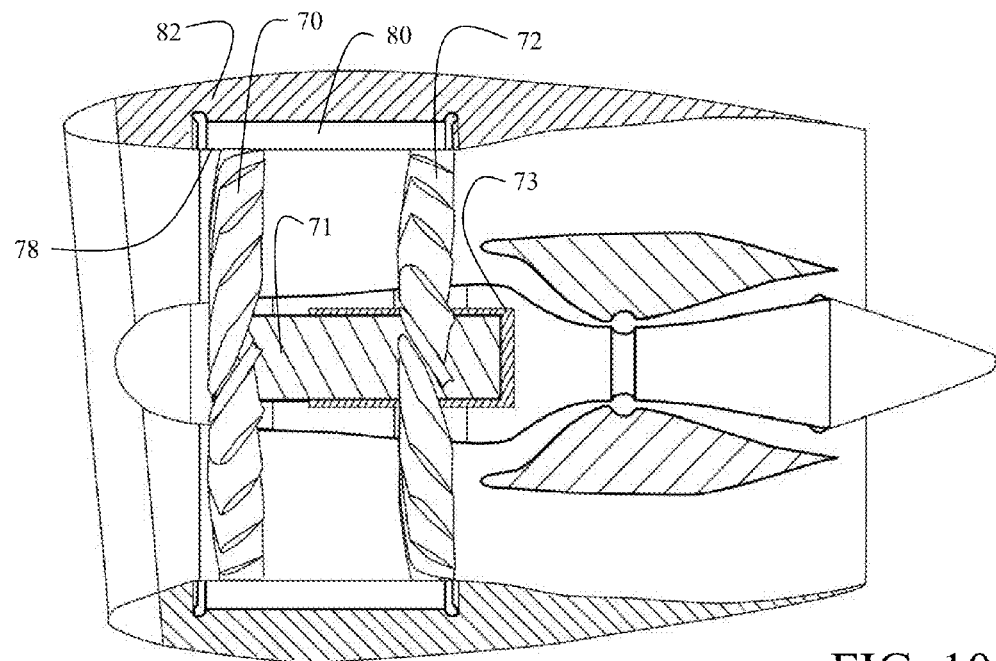
FIG. 10A is a side section view of a ducted counter rotating fan embodiment with a translating forward blade row in the retracted position.
Figure 10B:
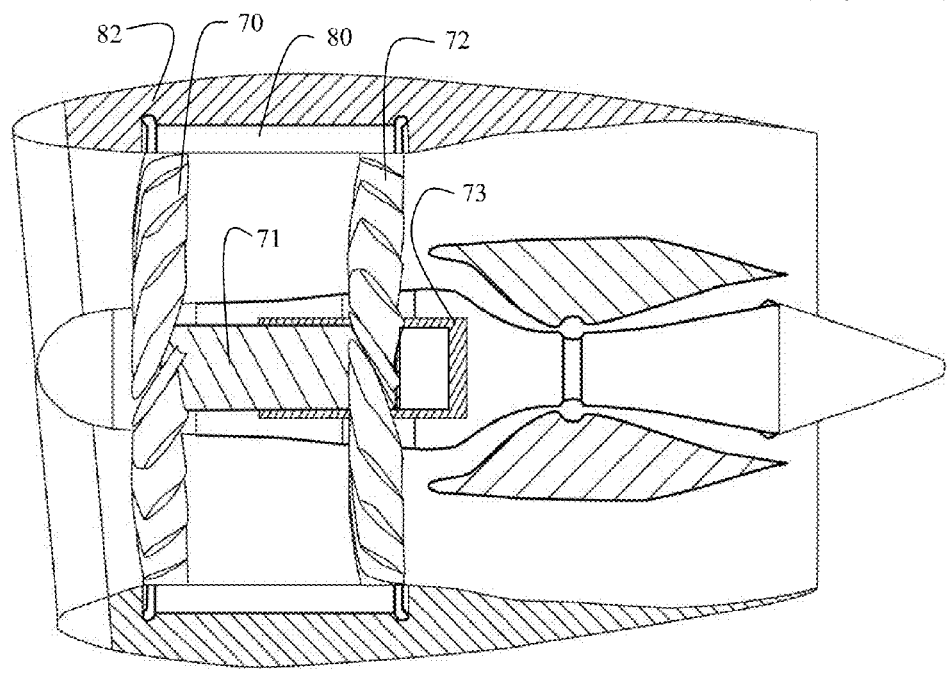
FIG. 10B is a side section view of the ducted counter rotating fan embodiment of FIG. 10A with a translating forward blade row in the extended position.

FIGS. 10A and 10B show an embodiment for a ducted counter rotating fan employing variable spacing between the upstream fan 70 and the downstream fan 72. For this embodiment, the upstream fan is the outer row relative to the engine core and is driven by shaft 71. The downstream fan is the inner row relative to the engine core and is driven by counter rotating transmission unit 73 powered by the engine core and concentrically supporting shaft 71. FIG. 10A shows the outer fan in the retracted position while FIG. 10B shows the fan in the extended position. For this embodiment, a spacing actuator comparable to that disclosed for the prior embodiment or as will be described in detail with respect to FIGS. 11A and 11B may be employed. The plane of rotation of the downstream fan 72 is fixed so that operability of the low pressure compressor (LPC) is not affected. A forward segment 78 of the fan duct 80, where translation of the upstream fan occurs, is a constant cross-section so that the spacing between the fan tip and fan duct does not change with upstream fan travel. The reinforced fan case 82 is extended forward into this actuation space as well. The ability to continually modulate fan spacing during the flight envelope is provided as previously described with respect to the CROF embodiment whereby optimum spacing for fan efficiency can be maintained outside of noise sensitive portions of the envelope and to accommodate high off-design inlet performance issues such as crosswind or high angle of attack (high alpha) operations.

For the embodiment of the ducted counter rotating fan described herein, the preferred spacing range for the upstream and downstream fans is reduced due to practical limitations in structural design of the fan duct with the minimum spacing ratio with respect to the fan diameter at about 0.2 and the maximum at about 0.4. Due to comparable physics the preferred $C_L/C_D$ ratio specified in FIG. 9 for the CROF embodiment applies as well, however this is maintained wholly by the spacing functionality as no pitch change unit is employed for the fan blades in the embodiment shown.

Figure 11A:
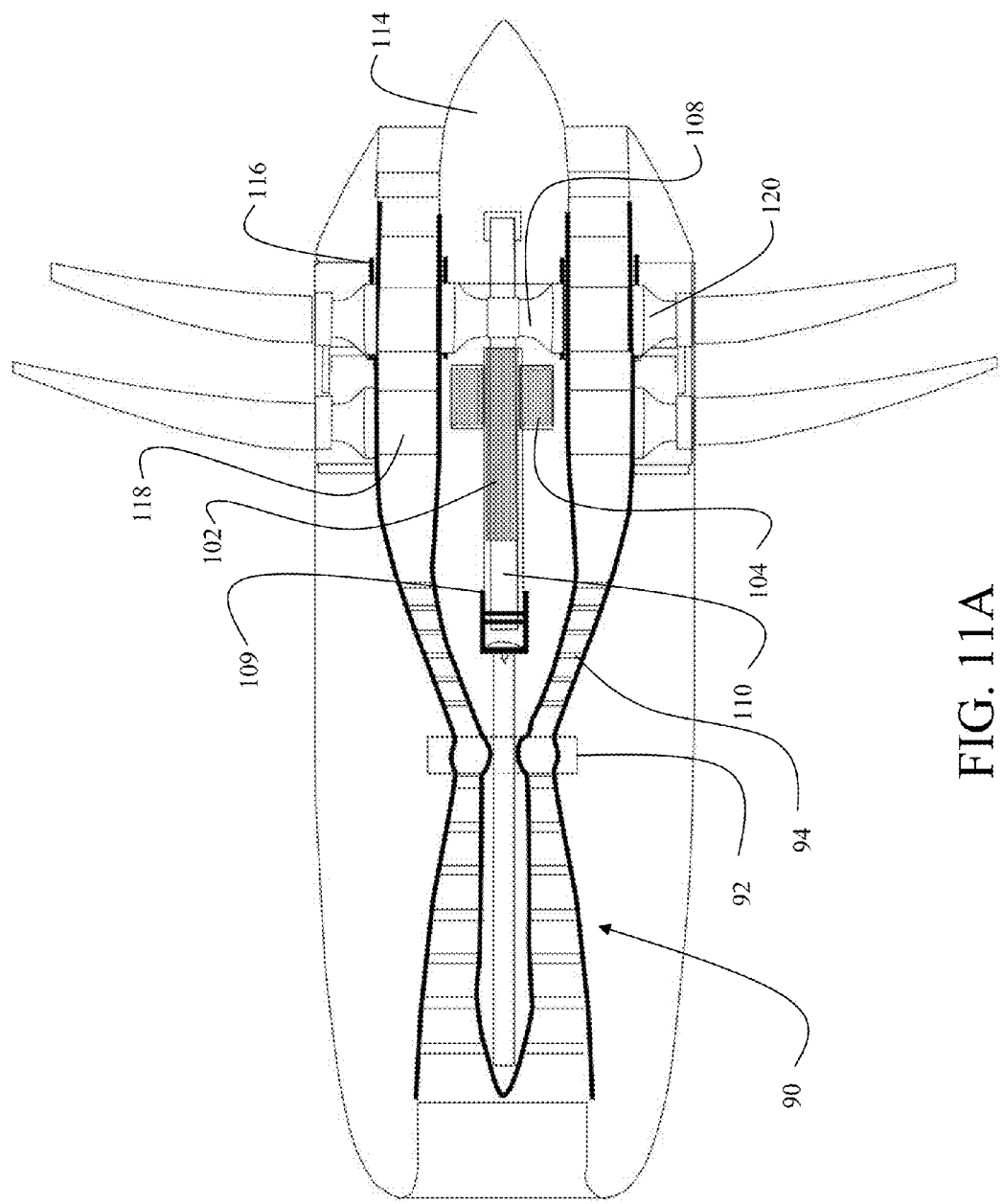
FIG. 11A is a side sectional view of an embodiment with a pusher configuration having the outer blade row in the retracted position.
Figure 11B:
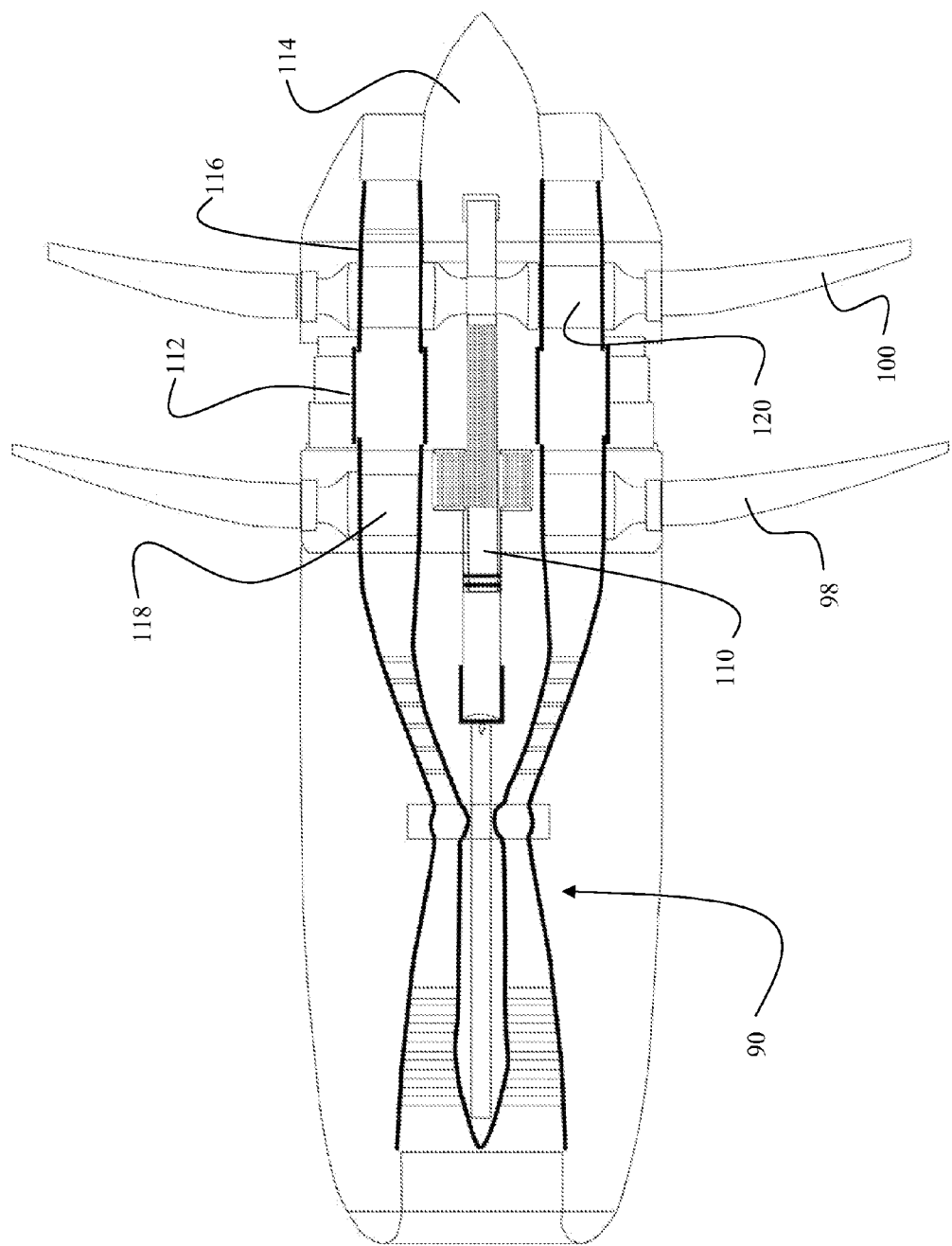
FIG. 11B is a side sectional view of the embodiment with a pusher configuration of FIG. 11A having the outer blade row in the extended position.

FIGS. 11A and 11B show another embodiment for a "pusher" configuration of the counter rotating open fan. Engine core 90 includes a combustor 92 followed in the flow path by a high-pressure turbine section 94 and a free power turbine section 96. Shaft 102 concentrically rotates in and exchanges power with counter rotation transmission unit 104. The counter rotation transmission unit is driven by the free power turbine section powering the inner blade row 98. The shaft 102 provides power for the outer or downstream blade row 100 through hub 108. For this embodiment, the downstream blade row or rotor is the outer row relative to the engine core and the upstream blade row or rotor is the inner row relative to the engine core. Translation of the shaft by a pressure cylinder 109 driving a piston 110 integral with the shaft 102 extends the outer rotor rearwardly for spacing adjustment between the upstream and downstream rotors. A translating exhaust duct 112 (best seen in FIG. 11B) provides continuity for exhaust flow from the engine core. For the embodiment shown a rotating plug 114 provides trailing aerodynamics for the exhaust flow. Rotating seals 116 are provided between the engine case and a rotating blade rows. Also for the embodiment shown a forward pitch control unit 118 provides blade pitch control for the upstream blade row and an aft pitch control unit 120 provides blade pitch control for the downstream blade row.

As previously described for the tractor CROF, counter rotation transmission unit 104 may employ a continuously variable transmission to allow optimization of both shaft horsepower input between the upstream blade row and downstream blade row in concert with rotational velocity through pitch control of the blades. Additionally ducting of ambient air through vents located between the upstream and downstream blade rows may be employed to reduce the magnitude of heat exposure to rotating components of the downstream blade row. For a pneumatic or hydraulic actuation of pressure cylinder 109, failure of the actuator would thereby allow thrust of the outer blade row to naturally induce retraction for placement of the blade rows in the minimum spacing position.

Figure 12:
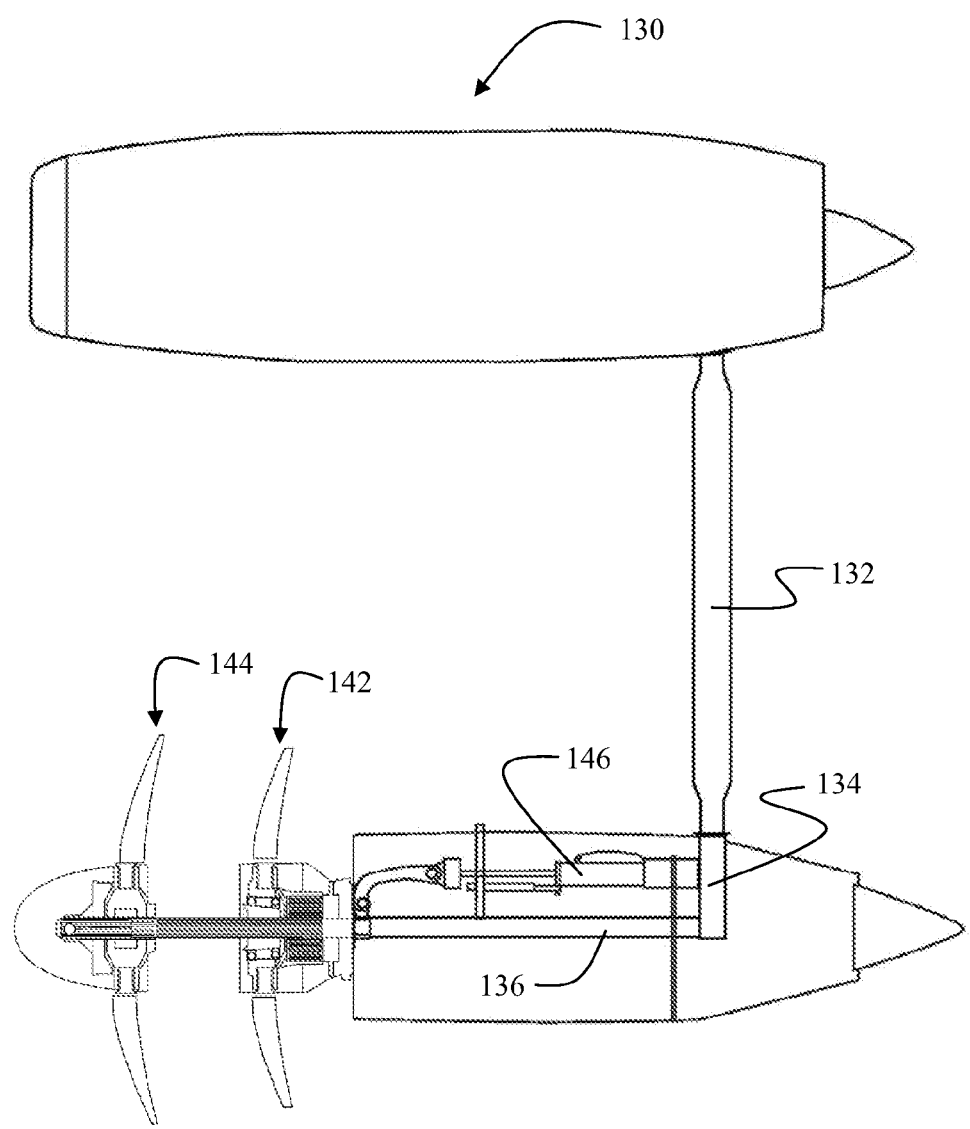
FIG. 12 is a section view of an embodiment with a counter rotating open fan offset from an engine core in a tractor configuration.
Figure 13:
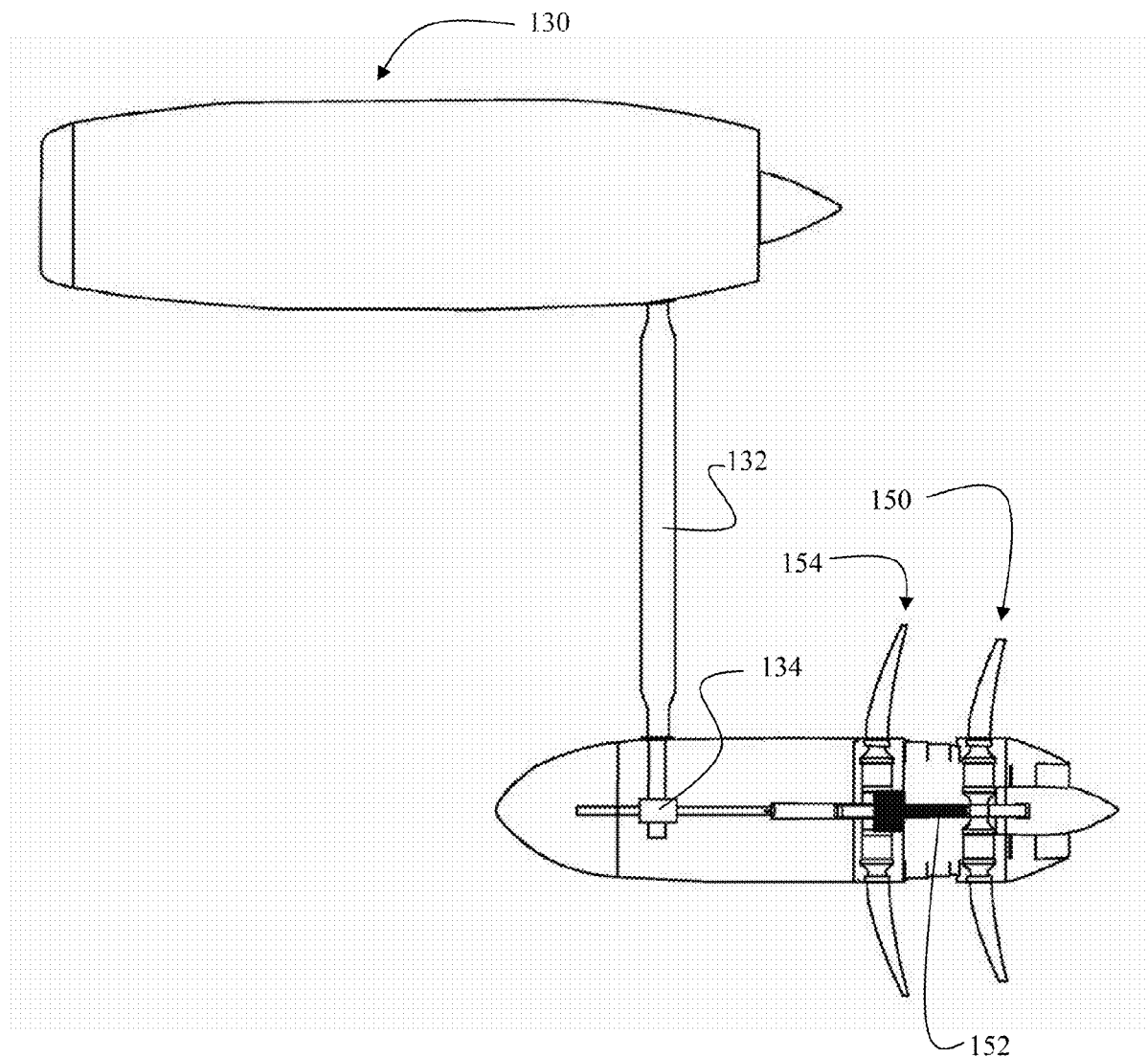
FIG. 13 is a section view of an embodiment with a counter rotating open fan offset from an engine core in a pusher configuration.

Additional embodiments shown in FIGS. 12 and 13 axially displace the blade rows from the engine core. These embodiments provide particularly advantageous capability for air vehicles which require the core gas generator engine to be either wholly or partially buried within the airplane outer mold line such as a blended wing body configuration. The embodiment shown is additionally applicable for an air vehicle which requires large propeller diameters such as vertical takeoff and landing (VTOL) aircraft. An engine core 130 incorporates a power takeoff shaft 132 which extends from the engine centerline. For exemplary embodiments the power takeoff shaft is coupled to the engine through a bifurcation of the turbine rear frame. A gearbox 134 provides power conversion to a central shaft 136 which extends through a concentric counter rotational transmission unit 140 associated with an inner blade row 142 as previously described with respect to FIGS. 4A-4D. Outer or upstream blade row 144 driven by the central shaft is displaceable from the inner or downstream blade row by an actuator 146 which displaces the shaft as previously described. In alternative embodiments, gearbox 134 may be integrated into the counter rotational transmission unit.

A pusher configuration is shown in FIG. 13 wherein the outer or downstream blade row 150 translates rewardly on a concentric shaft 152 as described with respect to the embodiment of FIGS. 11A and 11B. Control of the shaft horsepower ratio between the inner or upstream blade row 154 and downstream blade rows and limited cropping of the downstream blade row is accomplished as previously described with respect to the initial embodiment. The embodiments shown in FIGS. 12 and 13 may be beneficial since neither set of propeller blade rows is affected by exhaust contamination from the gas core generator and does not influence or impact the intake air stream for the engine core.

Figure 14:
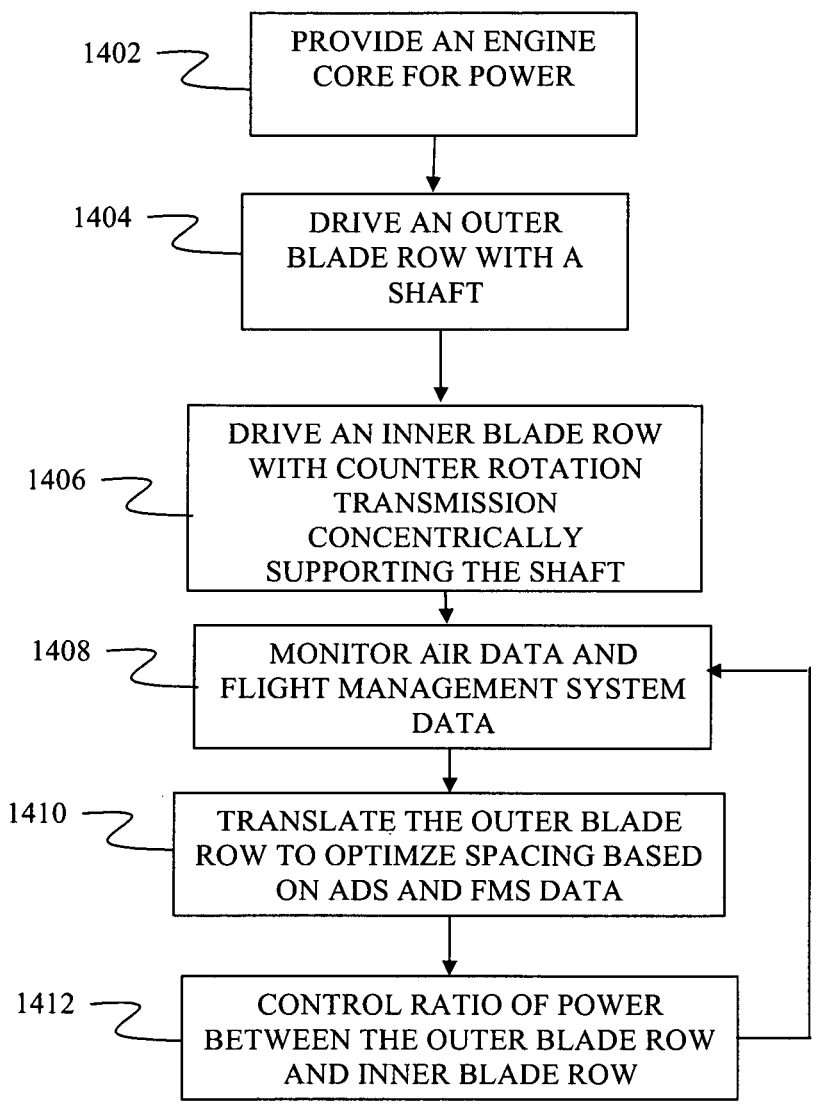
FIG. 14 is a flow chart of operational control of the counter rotating fan for optimized performance and noise reduction.

Operation of the translation system for the embodiments disclosed is accomplished as shown in FIG. 14. An engine core is provided to produce power as defined in step 1402. Power from the engine core is extracted by the low pressure turbines for driving an outer blade row with a shaft as defined in step 1404 and for driving an inner blade row with a counter rotation transmission concentrically supporting the shaft as shown in step 1406. For optimizing the spacing of the inner and outer blade rows for aerodynamic performance and for noise, data from the air data system and flight management system are monitored, step 1408, and the outer blade row is translated relative to the inner blade row for optimized operation, particularly including at low speed in the takeoff profile, as determined by a controller based on the ADS and FMS data as shown in step 1410. Power distribution to the inner blade row and outer blade row is controlled for optimized ratio of power generation between the upstream blade row and the downstream blade row based on the translated position as shown in step 1412. Power distribution may be accomplished in certain embodiments by alternating pitch control for increments in power change to the blade rows. Additionally, momentarily reducing lift of the translating blade row may be accomplished to minimize the blade row translation force required.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for noise reduction in counter rotating fan propulsion of an air vehicle comprising:
   driving an outer blade row with respect to an engine core in rotating motion using the engine core;
   driving an inner blade row with respect to the engine core in counter- rotating motion using the engine core;
   generating a variable and real-time spacing schedule using a digital control unit;
   translating the outer blade row incrementally between an extended and a retracted position relative to the inner blade row during operation of the air vehicle during portions of a flight profile in response to said variable and real-time spacing schedule;
   controlling power distribution to the inner blade row and outer blade row for lower thrust generation by the outer blade row in a translated position.

2. The method of claim 1 wherein controlling power distribution includes adjusting pitch control for a ratio of power extracted from the power shaft by the outer and inner-blade rows.

3. The method of claim 2 wherein controlling power distribution includes momentarily altering lift of the translating outer blade row to minimize the outer blade row translation force required.

4. The method of claim 1 further comprising providing a counter rotation transmission for exchanging power to drive the inner and outer blade rows.

5. The method of claim 1 wherein translating the outer blade row to optimize spacing is controlled based on an air data system and flight management system data.

6. The method of claim 1 further comprising arranging the outer blade row and inner blade row in a tractor configuration with the inner blade row downstream and having a smaller diameter than the outer blade row.

7. An air vehicle propulsion system comprising:
   an engine core;
   a power shaft connected to the engine core;
   an outer blade row with respect to the engine core driven by the power shaft;
   an inner blade row with respect to the engine core driven in counter rotational motion to the outer blade row; and
   an actuator engaging and positionally displacing the power shaft, said actuator operatively connected to a digital control unit and receiving a control input during portions of a flight profile from the digital control unit, wherein said digital control unit is configured to variably adjust the position of the power shaft and the outer blade row relative to the inner blade row in real time in response to a spacing schedule.

8. The air vehicle propulsion system as defined in claim 7 further comprising:
   a counter rotation transmission unit carrying the inner blade row, said power shaft extending through and supported by said counter rotation transmission unit.

9. The air vehicle propulsion system as defined in claim 8 wherein the counter rotation transmission unit interfaces with a pitch control unit for the inner blade row.

10. The air vehicle propulsion system as defined in claim 9 wherein the outer blade row includes a pitch control unit.

11. The air vehicle propulsion system as defined in claim 10 wherein the outer and inner blade rows have even numbers of blades and the pitch control units for each blade row are sequenced to change pitch of alternating blades in the respective row.

12. The air vehicle propulsion system as defined in claim 10 wherein the outer blade row is upstream of the inner blade row in a tractor configuration and power distributed by the power shaft to the outer blade row as controlled by the outer blade row pitch control unit is less than power distributed to the inner blade row as controlled by the inner blade row pitch control unit with the outer blade row in an extended position.

13. The air vehicle propulsion system as defined in claim 12 wherein the power distributed to the outer blade row is a ratio of about 0.8 of the power distributed to the inner blade row.

14. The air vehicle propulsion system as defined in claim 13 wherein the inner blade row has a diameter cropped by less than 5% of a diameter of the outer blade row.

15. The air vehicle propulsion system as defined in claim 7 wherein translation of the shaft is incrementally variable from a retracted position to an extended position.

16. The air vehicle propulsion system as defined in claim 7 wherein the outer blade row is upstream of the inner blade row in a tractor configuration.

17. An air vehicle propulsion system comprising:
an engine core;
a power shaft connected to the engine core;
an outer blade row with respect to the engine core driven by the power shaft;
an inner blade row with respect to the engine core driven in counter rotational motion to the outer blade; and
an actuator engaging the power shaft and selectively extending the power shaft thereby variably spacing the outer blade row from the inner blade row, said actuator operatively connected to a digital control unit and receiving a control input during portions of a flight profile from the digital control unit, wherein said digital control unit is configured to variably adjust the position of the power shaft and the outer blade row relative to the inner blade row in response to a spacing schedule from a minimum spacing position of between 0.1 to 0.2 times a diameter of the outer blade row to between 0.4 to 0.5 times the diameter during operation of the air vehicle in portions of a flight profile.

18. An air vehicle propulsion system comprising:

an engine core;

a power shaft connected to the engine core;

an outer blade row with respect to the engine core driven by the power shaft;

an inner blade row with respect to the engine core driven in counter rotational motion to the outer blade; and an actuator engaging the power shaft and selectively extending the power shaft over a range from a retracted to an extended position thereby variably spacing the outer blade row from the inner blade row, wherein the actuator is operably connected to a digital controller having a real-time spacing schedule enabling a variable propeller spacing configuration throughout the entire flight regime to be continually optimized in-flight for all airspeeds and flight trajectory angles.

\* \* \* \* \*